United States Patent [19]
Harms et al.

[11] Patent Number: 5,980,740
[45] Date of Patent: Nov. 9, 1999

[54] STORM DRAIN COLLECTION BOX FILTRATION SYSTEM

[75] Inventors: Rodney C. Harms, Manhattan, Kans.; Paul W. Stiles, Dallas, Tex.; George E. Preuss, Wamego, Kans.

[73] Assignee: Civitas Erosion Services, Inc., Dallas, Tex.

[21] Appl. No.: 09/003,396

[22] Filed: Jan. 6, 1998

[51] Int. Cl.[6] .................................................. B01D 29/17
[52] U.S. Cl. .......................... 210/162; 210/163; 210/170; 210/460; 210/497.1; 210/499; 404/4
[58] Field of Search .................................. 210/154, 155, 210/162, 163, 164, 170, 335, 338, 459, 460, 489, 497.1, 499; 404/4, 5

[56] References Cited

U.S. PATENT DOCUMENTS

| | | |
|---|---|---|
| 114,270 | 5/1871 | Dark . |
| 122,209 | 12/1871 | Ashman et al. . |
| 185,017 | 12/1876 | Dark . |
| 232,948 | 10/1880 | Dernham . |
| 317,011 | 5/1885 | Porter ....................................... 210/163 |
| 524,668 | 8/1894 | Hawkins ................................. 210/162 |
| 783,556 | 2/1905 | Van . |
| 1,060,338 | 4/1913 | Gschwind . |
| 1,521,883 | 1/1925 | Hess ........................................ 210/163 |
| 1,654,247 | 12/1927 | Egan ............................................ 404/4 |
| 1,862,134 | 6/1932 | Boosey ..................................... 210/163 |
| 2,102,310 | 12/1937 | Egan . |
| 2,182,795 | 12/1939 | Day . |
| 2,615,526 | 10/1952 | Lane . |
| 2,929,504 | 3/1960 | Lind ........................................ 210/162 |
| 3,047,156 | 7/1962 | Wasson ................................. 210/497.1 |
| 3,667,615 | 6/1972 | Likness ................................. 210/497.1 |
| 3,881,832 | 5/1975 | Maguire . |
| 4,112,691 | 9/1978 | Ebeling et al. .......................... 210/163 |
| 4,419,232 | 12/1983 | Arntyr et al. . |
| 4,793,728 | 12/1988 | Ellis . |
| 4,859,322 | 8/1989 | Huber ...................................... 210/162 |
| 4,871,454 | 10/1989 | Lott . |
| 4,986,693 | 1/1991 | Salberg et al. . |
| 5,053,129 | 10/1991 | Kitson .................................. 210/497.1 |
| 5,066,165 | 11/1991 | Wofford et al. . |
| 5,069,781 | 12/1991 | Wilkes . |
| 5,102,537 | 4/1992 | Jones ....................................... 210/162 |
| 5,133,619 | 7/1992 | Murfae et al. . |
| 5,152,892 | 10/1992 | Chambers ............................ 210/497.1 |
| 5,232,587 | 8/1993 | Hegemier et al. . |
| 5,234,882 | 8/1993 | Savoie ..................................... 210/455 |
| 5,405,539 | 4/1995 | Schneider . |
| 5,581,934 | 12/1996 | Arnold, Sr. ............................. 210/162 |
| 5,770,057 | 6/1998 | Filion ...................................... 210/162 |

*Primary Examiner*—Christopher Upton
*Attorney, Agent, or Firm*—Litman, Kraai & Brown L.L.C.

[57] ABSTRACT

A filtration system for storm drain collection boxes includes a helical coil frame, open at both ends, which coil frame is attached at an exit end to a vertical exit side wall of the collection box with the exit end aligned with a collection box outlet opening. The opposite, inlet end of the coil frame is suspended from a ceiling of the collection box, and a filter fabric "sock", which is also open at both ends, is positioned surrounding the coil frame. The inlet end of the coil frame is positioned at a level below the ceiling of the collection box. The filter sock normally filters out silt, sediment and solid materials from storm water run-off before the water enters the storm drainage system but the open inlet end of the coil frame and sock acts as an overflow during flooding conditions to permit storm water to bypass the filtration provided by the filter sock while still filtering out solid materials via a wide mesh screen.

23 Claims, 3 Drawing Sheets

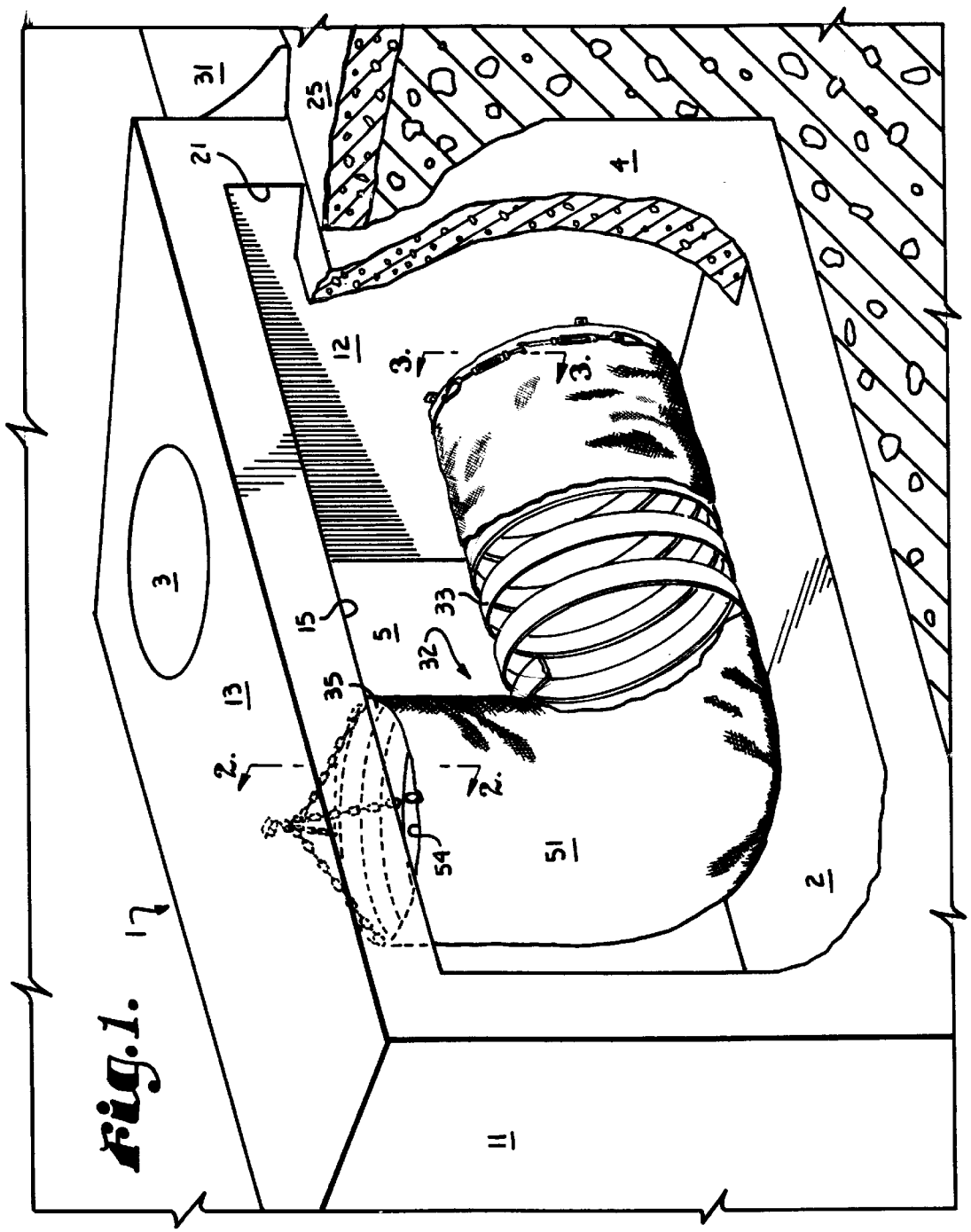

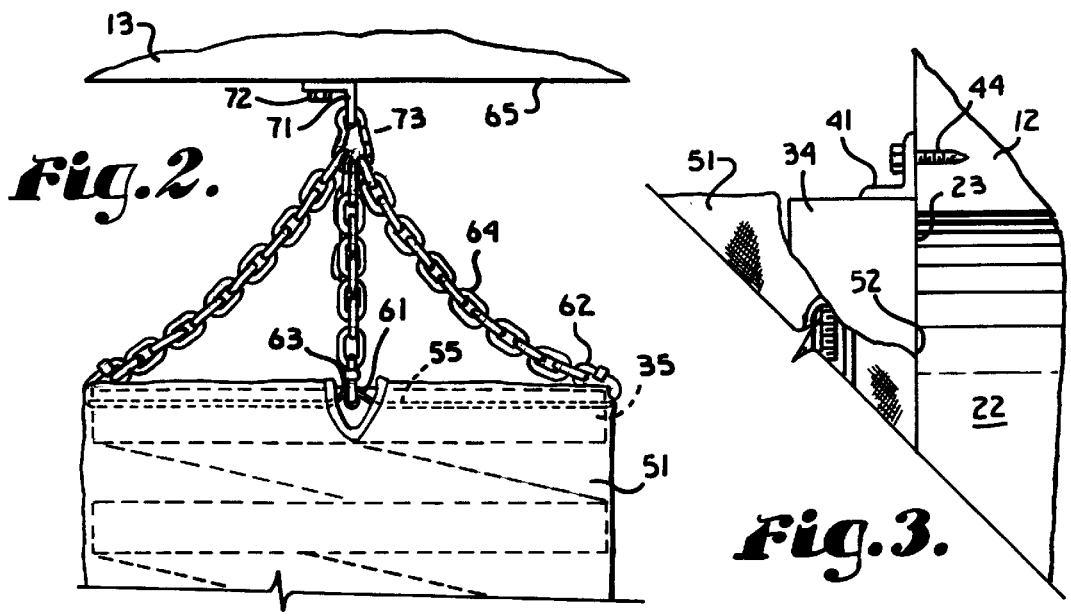
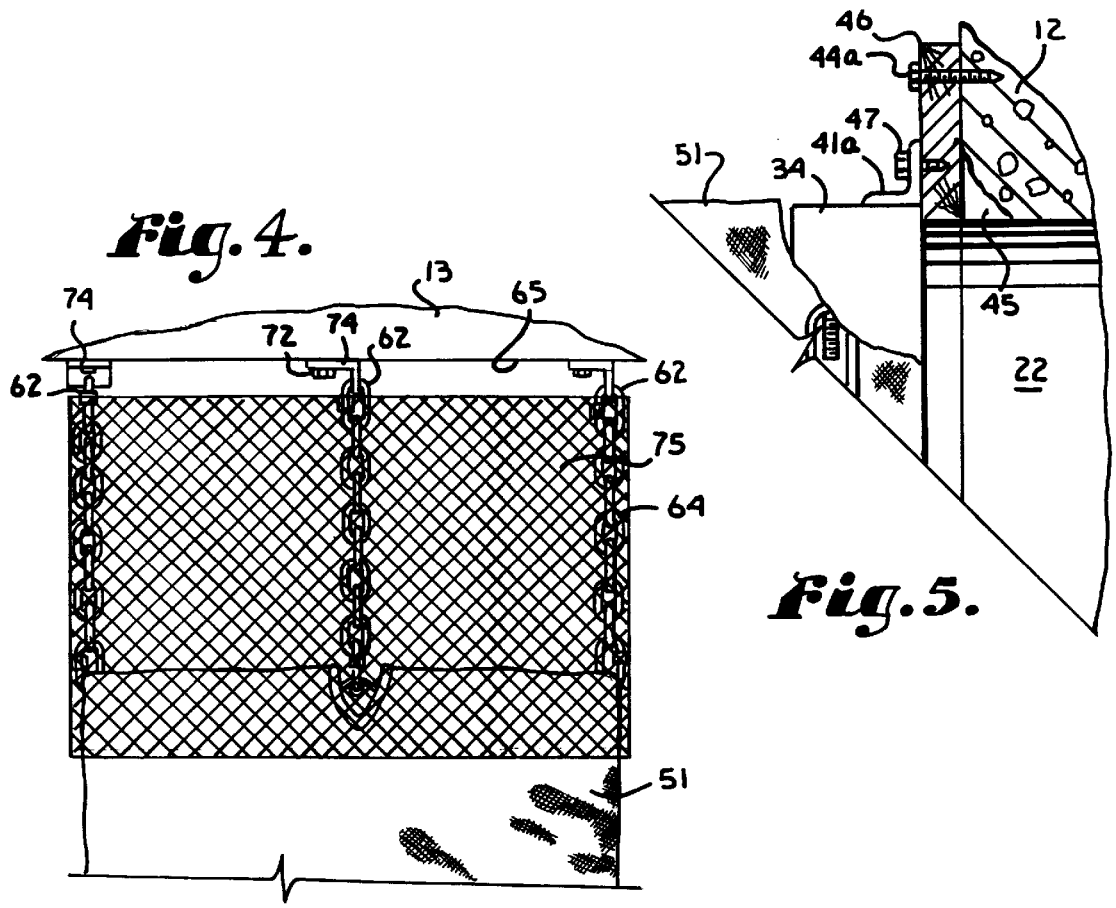

STORM DRAIN COLLECTION BOX FILTRATION SYSTEM

BACKGROUND OF THE INVENTION

I. Field of the Invention

The present invention relates to a filtration system for use in storm drain collection boxes, and, more particularly, to such a system in which a sock or sleeve made of filtration fabric is supported by a helical frame with one open end of the frame being attached to and suspended from a ceiling of the collection box and an opposite open end of the frame being attached to an exit sidewall of the collection box in alignment with an outlet opening in the box.

II. Description of the Related Art

The handling of storm water run-off is an ongoing problem in many communities. Residential and commercial development results in streets, roadways and parking lots, houses and other buildings replacing soil, tree and plant life. This means that the natural moisture absorbing properties of the soil and plants are taken away and replaced by these moisture impervious structures. Thus, when rain and snowfall do occur, the run-off of water from these developed areas is much faster and occurs with greater volume and erosive tendencies than previously.

This increased run-off in developed areas is typically handled by the installation of below ground storm water drainage pipe systems which collect the water via a series of storm drain collection boxes. The collection boxes are typically concrete receptacles with curb drainage inlets positioned at collection points where water is funneled via roadways, parking lots and curbs. Typically these storm water drainage systems output collected water directly into downstream waterways and lakes with no water treatment or filtration.

Ever increasing concern for the environment and more stringent government requirements on the passing of silt, sediment and solid materials into waterways have created problems in the handling of storm water. In many cities and states new environmental regulations require developers to utilize "Best Management Practices" to decrease or eliminate the introduction of silt, sediments, solid materials and other pollutants into the waterways. This presents a major problem for developers who must use existing techniques for handling storm water run-off. As a final collection point prior to release from a development site, storm drain collection boxes offer an opportunity to process and improve storm water quality before it is discharged into the waterways. The pursuit of Best Management Practices requires that new filtration systems must be developed to adapt existing storm water collection boxes to the new regulations.

A common method of attempting to deal with filtration in collection boxes are a class of filters that are commonly referred to as "throat filters". These are positioned at street level at the inlet mouth of the collection boxes. These throat filters can be simple and economical, e.g. sand bags, but present a number of problems. Throat filters are typically placed over or around the collection box opening and function primarily as a sediment and solid materials barrier. They are in clear view i.e. on the pavement surface and are thus often removed by property owners for aesthetic reasons. When functioning properly, throat filters offer poor filtration properties and, by design, block the entrance of storm water into the collection box. Thus storm water either bypasses the collection box or begins to pool on the adjacent pavement resulting in localized flooding. This causes pedestrian and vehicle hazards during a heavy rain. The hazard continues after the storm water drains or evaporates away when it leaves behind a layer of deposited sediment and solid materials (cups, cans, papers, etc.) around the throat filters, i.e. on the pavement. Finally, throat filters require considerable maintenance, particularly immediately after a storm and are typically not anchored, which means that they can be lifted by hydraulic pressure during heavy rains, thus allowing unfiltered water to enter the collection box under the lifted filter.

One attempt to fit existing collection boxes with an internal filtration system is found in U.S. Pat. No. 5,405,539 to Thomas Schneider. In the Schneider system, a filter frame is inserted into the collection box in pieces and assembled therein. The frame includes a telescoping bed portion which is positioned adjacent to the front of the collection box with a frame back portion abutting the bed portion such that, when assembled, the bed and back portions resemble "a bench-type seat". A sheet of filter material is then laid over the bed and back portions. The bed portion is supported off of the floor of the collection box by a series of legs and is urged in position against the front of the box by pneumatic cylinders. Water entering the collection box, as modified by the Schneider filter system, flows onto the bed portion and through the sheet of filter material, which filters out dirt, sediment and solid materials with the filtered water then flowing out of the collection box outlet. Should the filter become clogged or when water inflow exceeds the capacity of the filter, unfiltered water flows over the back portion and out of the collection box outlet.

A number of problems are also presented by the Schneider system. The capacity of the Schneider system is very limited since only the bed portion, and the back portion in heavy rains, is available for filtration area and, thus, the total square footage of filtration area is relatively small. This means that overflow of non-filtered water may occur in fairly low intensity rains. The elevation of the bed portion off of the floor of the collection box by the legs and the positioning of the bed portion in front of the box makes it visible and accessible from the box inlet mouth. This position and the horizontal orientation of the bed portion mean that the capacity of the Schneider filter system for holding trash and debris is fairly limited and also makes collected sediment and debris visible from the box mouth, presenting an unsightly condition, and, when the filter is clogged, can result in pooling of stagnant water on the clogged horizontal bed surface. Finally, the Schneider filter requires frequent maintenance as well, preferably after each storm event, and the occupation of the majority of the collection box by the Schneider filter frame means that it is difficult to get a person inside the box to change the filter material and remove solid materials.

It is clear then, that a need exists for an effective storm water collection box filtration system which is usable with existing collection box designs. Such a filtration system should preferably be economical, easily and quickly installed, and should occupy a minimal volume of the collection box, thus making the bulk of the collection box itself available as a solid materials collector. The filtration system should preferably maintain the integrity of the engineered storm water system design and capacity as closely as possible and should require less maintenance than prior art systems but yet be simpler and easier to clean and maintain. Finally, the filtration system should be adaptable to virtually any size of collection box and storm water pipe outlet, which sizes vary considerably by locale and local design considerations.

SUMMARY OF THE INVENTION

The present invention is a filtration system for storm drain collection boxes and includes a helical coil frame, open at both ends, which frame is preferably sized with an internal diameter somewhat larger than an inner diameter of an outlet opening in the collection box. One end of the frame is attached to a vertical exit side wall of the collection box with the coil open outlet end positioned adjacent to and in alignment with the collection box outlet opening. The coil end can be attached directly to the wall of the collection box via concrete anchors and brackets. Alternatively, in the case of an irregularly shaped opening or irregular grouting at the outlet opening, a buffer or bridge such as a sheet of plywood or metal collar with a regularly shaped round opening therein aligned with the box outlet opening, can be attached to the box wall and the coil end attached to the buffer surrounding the buffer opening.

The opposite, open end of the coil frame is attached to a first end of a plurality of chains or cables spaced around the periphery of the coil open inlet end. An opposite end of each chain is equipped with a hook or other suspension device which is, in turn, attached to one or more brackets installed directly in the ceiling of the collection box, again via concrete anchors or the like. The chains are of a length such that the upper, open inlet end of the coil frame is suspended below the collection box ceiling, preferably just below pavement level. A filter fabric "sock" or sleeve which is also open at both ends, is positioned surrounding the coil frame with each end of the sock being anchored to a respective end of the coil frame. A layer of wide mesh screen can be installed around the chains and above the sock inlet opening to prevent larger sized solid materials from entering the filter sock and coil frame.

PRINCIPAL OBJECTS AND ADVANTAGES OF THE INVENTION

The principal objects and advantages of the present invention include: providing an improved filtration system for storm drain collection boxes; providing such a filtration system which occupies a relatively small volume of the collection box; providing such a filtration system which allows the collection box itself to function as a solid materials collector; providing such a filtration system which is relatively easy to install; providing such a filtration system which allows unfiltered water to bypass the filter during severe storm or flooding conditions; providing such a filtration system which preserves, to the extent possible, the engineered design and capacity of the storm water collection system in which it is installed; providing such a filtration system in which the entire system can be easily inserted through the manhole in the collection box; providing such a filtration system which can be readily adapted for differing sizes of collection boxes and collection box outlet pipes; providing such a collection system which can be easily and economically maintained and cleaned; and providing such a filtration system which is efficient and reliable, economical to manufacture and which is particularly well suited to its intended purpose.

Other principal objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of the inventive filtration system installed in a storm drain collection box positioned beside a pavement surface, with portions of the pavement, the front wall of the collection box and the filter sock broken away to better illustrate the invention and with portions of the upper end of the filtration system shown in phantom lines.

FIG. 2 is an enlarged, fragmentary cross-sectional view of an upper, inlet portion of the filtration system, taken along line 2—2 of FIG. 1, with the helical coil frame shown in phantom lines and illustrating attachment of a plurality of support chains to a single bracket in the ceiling of the collection box.

FIG. 3 is a fragmentary cross-sectional view of a portion of the exit end of the filtration system, taken along line 3—3 of FIG. 1, with portions of the filter sock broken away to illustrate a portion of the helical coil frame attached to the collection box wall.

FIG. 4 is a fragmentary cross-sectional view of an upper portion of the filtration system, showing an alternative way of attaching the support chains to the collection box ceiling and also illustrating the use of a coarse mesh screen surrounding the chains to prevent large solid materials from entering the upper, inlet end of the filter.

FIG. 5 is a fragmentary cross-sectional view of a portion of the exit end of the filtration system showing the use of a buffer or bridge including a sheet of plywood positioned between the helical coil frame and the collection box wall to compensate for irregularities in the collection box outlet pipe.

DETAILED DESCRIPTION OF THE INVENTION

Figure 6:
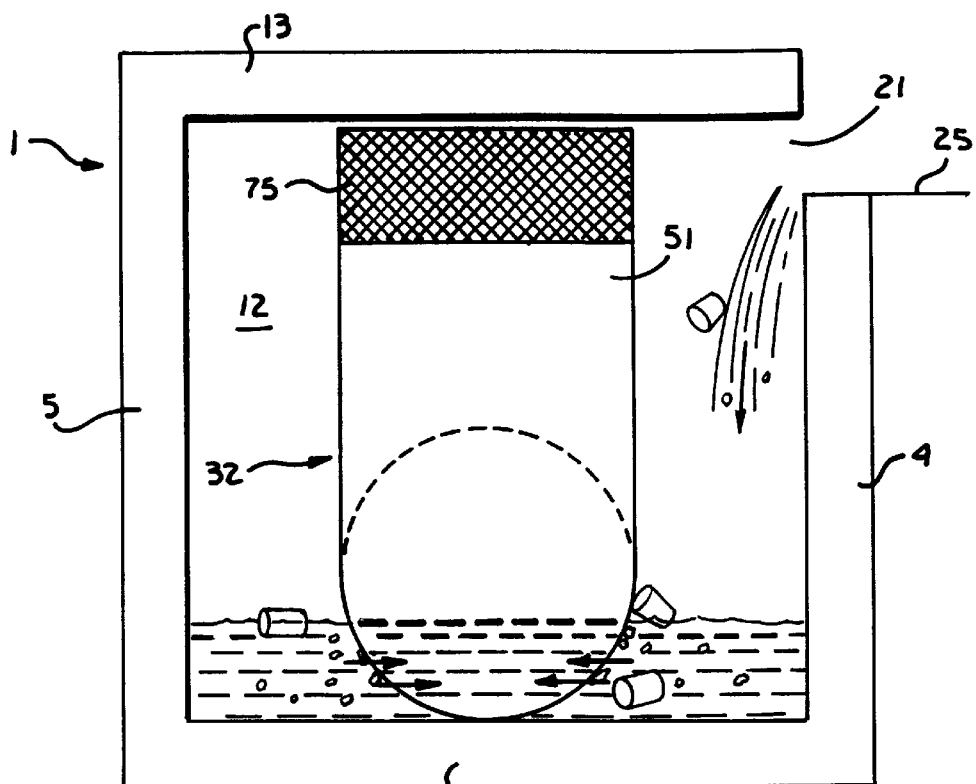
FIG. 6 is a partially schematic end elevational view of the inside of the collection box showing the inventive filtration system with water flowing into the collection box from the pavement, through the filter sock and to the collection box outlet opening, as would typically happen during a rain storm or during melting snow.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "front", "rear", "right" and "left" will refer to directions in the drawings to which reference is made.

Referring to the drawings in more detail the reference numeral 1 in FIG. 1 generally indicates a conventional concrete storm drain collection box with a floor 2, a manhole 3, a front wall 4, a rear wall 5, a left side wall 11, a right or exit side wall 12, and a top wall 13. The manhole 3 extends through the top wall 13 and connects with an interior collection space 15. The front wall 4 extends upward to within a few inches of the top wall 13, leaving a gap which serves as an inlet mouth 21 into the collection box 1. An outlet pipe 22 (FIG. 3) is attached to a circular outlet opening 23 in the right or exit side wall 12 of the collection box 1 which outlet pipe 22 connects to a typical below ground storm drainage system (not shown).

The collection box 1 is shown installed in an excavation immediately adjacent a typical pavement 25, and, preferably, at a gravity fed collection point. Storm water is funneled into the inlet mouth 21 via curbs 31 which are cut to allow water to flow off of the pavement surface and into the collection box 1. With conventional, i.e. nonfiltered, installations, water, along with sediment and solid materials would simply flow into the collection box 1 via the inlet mouth 21 and then flow out of the outlet pipe 22 and into downstream waterways and lakes via the storm water drainage system (not shown).

The inventive filtration system is shown in each of FIGS. 1–7, and is generally indicated at 32. The system 32 includes a helical coil frame 33 which is preferably constructed from coiled steel strap(s) and is open at both ends. The coil frame 33 terminates at one end in a circular exit loop 34 and at the other end in an inlet loop 35. The coil frame 33 is both expandable and flexible, yet can be entirely inserted into the collection box 1 via the manhole 3. A plurality of L shaped brackets 41 each has one leg attached to the exterior of the exit loop 34. The brackets 41 are spaced about the periphery of the loop 34 and each bracket 41 has a second leg which is attachable to the exit side wall 12 of the collection box 1 via concrete anchors 44. When properly positioned, the exit loop 34 completely surrounds the collection box outlet opening 23 which connects to the inlet of the outlet pipe 22 with the exit loop 34 being positioned immediately adjacent to the exit wall 12.

FIG. 5 illustrates an alternative method for attaching the exit loop 34 to the exit side wall 12 when the entrance to the exit opening is irregular or discontinuous, such as where a gap 45 is formed in the grout surrounding the outlet pipe. A ring 46 of plywood or other suitable material with an opening sized to match the outlet opening 23 is first attached to the exit wall 12 via concrete anchors 44 or the like. The exit loop 34 of the frame 33 is then attached to the regular, smooth inside surface of the ring 46 via the spaced brackets 41a and wood screws 47 to form a relatively tight seal. The buffer attachment of FIG. 5 can also be used to adapt the filter system 32 when the exit ring 34 is smaller in diameter than the collection box outlet opening 23.

A filter sock 51 is positioned surrounding the entire length of the coil frame 33. The filter sock 51 has an open exit end 52 which is tightly secured about the exit loop 34 of the coil frame 33 via an adjustable encircling member such as, for example, by a cord of stranded steel fibers 53 linked by a series of linked turn buckles 53a, as shown in FIG. 1.

The filter sock 51 also has an open inlet end 54 which, in the preferred embodiment, is folded over and sewn to yield an encircling pocket 55 within which is positioned a cord 61 which can be made of stranded steel fibers, for example. The entrance end 54 of the filter sock 51 is attached to the inlet loop 35 of the coil frame 33 via a plurality of separable chain links 62, each of which extend through a respective cut-out 63 in the filter sock encircling pocket 55, around the cord 61 and through a respective through bore (not shown) in the coil frame inlet loop 35. Each separable chain link 62 is then attached to one end of a respective chain 64. The chains 64 are then used to suspend the coil frame 33 and attached filter sock 51 from a ceiling surface 65 (the bottom side of the top wall 13) of the collection box 1.

FIGS. 2 and 4 illustrate two of a number of possible arrangements for attaching the chains 64 to the collection box ceiling 65. Referring to FIG. 2, a single L shaped bracket 71 is attached to the ceiling 65 via a concrete anchor bolt 72. All four of the chains 64 are then attached to a common spring clip 73, which spring clip 73 is then placed in an opening in the L bracket 71.

In FIG. 4, a plurality of separate L shaped brackets 74 are anchored into the ceiling 65 via a respective anchor bolt 72, with the brackets 74 being arrayed in a circumference of an approximate circle on ceiling 65. Each chain 64 is then attached to a respective bracket 74 via an additional separable chain link 62. In FIG. 4, an optional additional filter comprising a coarse mesh screen 75 is positioned surrounding the upper portion of the filter sock 51 and coil frame 33 and the chains 64 to occupy the space between the top of the filter sock 51 and the ceiling 65. The screen 75, which can be attached to the chains 64 via clips, wires, etc. (not shown) serves to filter out large debris such as cans, bottles, papers, etc. so that they are retained in the collection box 1 even during times of flooding.

Figure 7:
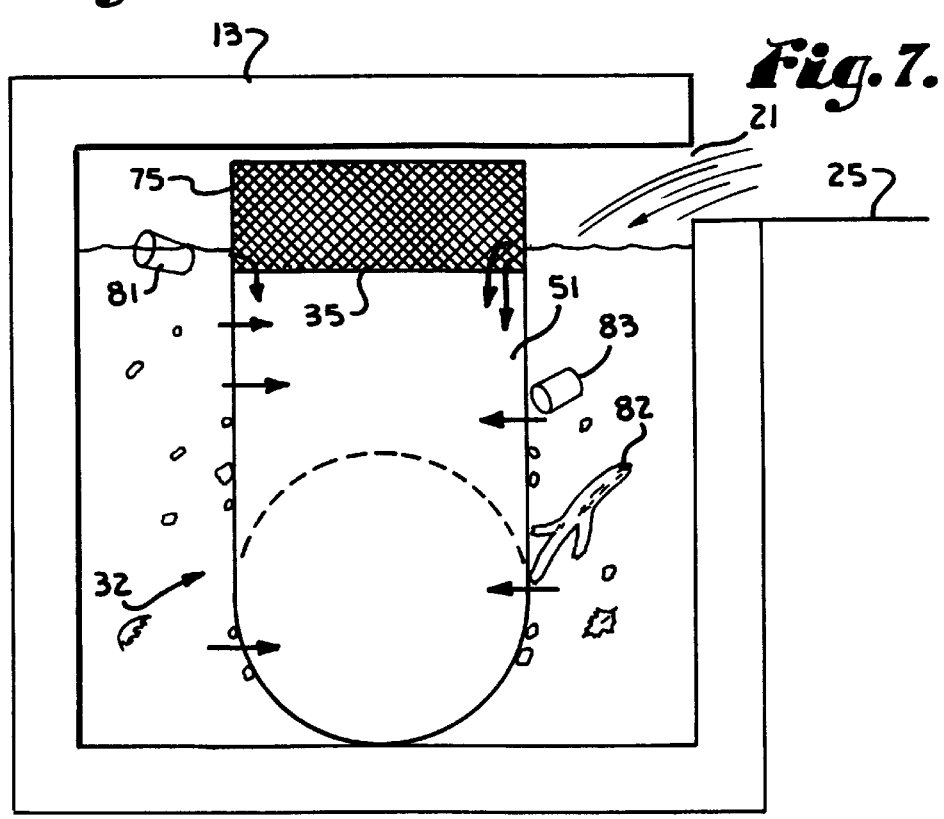
FIG. 7 is a partially schematic end elevational view of the inside of the collection box showing the inventive filtration system with water flowing into the collection box from the pavement, through the filter sock and into the collection box outlet pipe, with some of the water overflowing the top of the filtration system and entering the open top of the filter sock via the coarse screen, as could happen during extreme weather conditions.

FIGS. 6 and 7 are partially schematic drawings illustrating the inventive filter system 32 in operation. Referring to FIG. 6, during typical precipitation events, water enters the collection box 1 via the inlet mouth 21 and drops to the bottom of the collection box 1. The water then flows through the sides of the filter sock 51 and the coil frame 33 with the filter sock 51 filtering out silt, sediment and solid materials. Once the water enters the frame 33 via the filter sock 51, the combination of the filter sock 51 and the coil frame 33 serve as a conduit to route most of the water to the collection box outlet opening 23.

FIG. 7, by contrast, represents a situation of substantial flooding, such as a sustained downpour of rain or a sudden melting of accumulated snow. In these conditions, water may enter the collection box 1 via the inlet mouth 21 faster than it can filter through the sides of the filter sock 51. The collection box 1 will thus fill with water and assorted solid materials. When the level of accumulated water rises above the level of the coil frame inlet loop 35, water will pour over the top of the frame inlet loop 35 and enter the interior of the coil frame 33. Again, the combination of the filter sock 51 and the coil frame 33 serve as a conduit to route most of the water to the collection box outlet opening 23. Even under flooding conditions, the optional coarse mesh screen 75 still prevents larger solid materials, such as a cup 81, stick 82, can 83, etc., from entering the storm drainage system.

In a preferred embodiment of the invention, the filter sock 51 was constructed from a length of filtration fabric such as a geotextile material similar to those manufactured by several manufacturers including LINQ Industrial Fabrics, Inc. and Amoco Fabrics and Fibers Company.

Variations on the invention will occur to those of skill in the art. For example, the coil frame 33 can be modified to incorporate integral brackets which can be attached directly to the collection box ceiling 65. The filter sock 51 has been illustrated as having a tubular construction but it could be implemented by using a flat sheet of filter fabric which is wrapped around the filter frame 33, overlapped and secured to itself. The filter frame 33 has been illustrated as a helical coil, but other shapes could be used as well, including linked square frames arranged to form an elongate square open frame or any other suitable shape which is open at or near both ends and which includes a number of other openings along its length which allow for the ingress of water through the covering filter sock 51. The filter sock 51, of course, if sized correctly, will assume virtually any shape of the underlying frame. Instead of the separable chain links 62, a myriad of other connection devices could be used, including, without limitation, spring clips, S hooks, etc. In order to seal the exit loop 34 of the coil frame 33 to an irregular wall of the collection box 1, instead of a plywood ring, any other suitable sealing or buffer material can be used, including grout, butyl rubber, etc.

It is thus to be understood that while certain forms of the present invention have been illustrated and described herein, it is not to be limited to the specific forms or arrangement of parts described and shown.

We claim:

1. A storm drain filtration system, comprising:
   a. an elongate hollow flexible frame with an exit opening and an inlet opening, said frame including at least one additional opening between said exit opening and said inlet opening to allow ingress of water therein; and
   b. a filter sock capable of substantially surrounding said frame and covering said at least one additional opening.

2. A storm drain filtration system as in claim 1, wherein:
   a. said flexible frame is capable of assuming an L shape with said exit opening positioned below said inlet opening.

3. A storm drain filtration system as in claim 2, and further comprising:
   a. an attachment mechanism designed to attach said frame to a ceiling of a storm drain collection box in a position with the frame inlet opening positioned at a level below the collection box ceiling.

4. A storm drain filtration system as in claim 3, said attachment mechanism comprising:
   a. a cord attached to and extending about the periphery of an open end of said filter sock;
   b. a plurality of elongate suspension members, each of which is attached at one end to said cord and to said frame near said inlet opening; and
   c. at least one bracket designed for attachment to the collection box ceiling, said suspension members being attachable at a second end to said at least one bracket.

5. A storm drain filtration system as in claim 4, wherein said elongate suspension members comprise chains.

6. A storm drain filtration system as in claim 2, wherein said frame comprises a flexible helical coil.

7. A storm drain filtration system as in claim 6, wherein said filter sock comprises an elongate tube of filtration fabric which is open at both ends and which is sized to slip over said helical coil frame.

8. A storm drain filtration system as in claim 1, wherein said exit opening in said frame is sized to surround the outlet opening in a storm drain collection box; said system further comprising:
   a. an attachment mechanism designed to attach said frame to an exit side wall of the collection box with said exit opening aligned with the outlet opening in the collection box.

9. A storm drain filtration system as in claim 8, wherein said attachment mechanism comprises a plurality of brackets arrayed around the exit opening of said frame and a plurality of anchors designed to anchor respective ones of the brackets to an exit sidewall of the collection box.

10. A storm drain filtration system as in claim 8, wherein said attachment mechanism comprises:
    a. a buffer with an aperture extending therethrough, said buffer being sized to attach to the collection box side wall with said aperture aligned with the outlet opening in the collection box, at least an inside surface of said buffer being relatively smooth; and
    b. a plurality of brackets arrayed around the exit opening of said frame and a plurality of anchors designed to anchor respective ones of the brackets to the inside surface of said buffer with said frame exit opening aligned with said aperture in said buffer.

11. A storm drain filtration system, comprising:
    a. an elongate flexible helical coil frame with an exit opening and an inlet opening, said frame including at least one additional opening between successive coils to allow ingress of water therein; and
    b. a filter sock comprising an elongate tube of filtration fabric which is open at both ends and which is sized to slip over said helical coil frame and substantially cover said additional opening.

12. A storm drain filtration system as in claim 11, and further comprising:
    a. an attachment mechanism designed to attach said frame to a ceiling of a storm drain collection box in a position with the frame inlet opening positioned at a level just below an inlet opening of the collection box.

13. A storm drain filtration system as in claim 12, said attachment mechanism comprising:
    a. a cord attached to and extending about the periphery of an open end of said filter sock;
    b. a plurality of elongate suspension members, each of which is attached at one end to said cord and to said coil frame near said inlet opening; and
    c. at least one bracket designed for attachment to the collection box ceiling, said suspension members being attachable at a second end to said at least one bracket.

14. A storm drain filtration system as in claim 13, wherein said elongate suspension members comprise chains.

15. A storm drain filtration system as in claim 11, wherein said exit opening in said coil frame is sized to surround an outlet opening in a side wall of a storm drain collection box; said system further comprising:
    a. an attachment mechanism designed to attach said frame to the side wall of the collection box with said exit opening aligned with the outlet opening in the collection box.

16. A storm drain filtration system as in claim 15, wherein said attachment mechanism comprises bracket(s) arrayed around the exit opening of said frame and a plurality of anchors designed to anchor the bracket(s) to the collection box sidewall.

17. A storm drain filtration system as in claim 15, wherein said attachment mechanism comprises:
    a. a buffer with an aperture extending therethrough, said buffer being sized to attach to the collection box side wall with said aperture aligned with the outlet opening in the collection box, at least an inside surface of said buffer being relatively smooth; and
    b. bracket(s) arrayed around the exit opening of said frame and a plurality of anchors designed to anchor the bracket(s) to the inside surface of said buffer with said frame exit opening aligned with said aperture in said buffer.

18. A storm water filtration system, comprising:
    a. a storm drain collection box which has an inlet opening and an outlet opening;

b. an elongate flexible helical coil frame with an exit opening and an inlet opening, said frame also including at least one additional opening between successive coils to allow ingress of water therein;

c. an first attachment mechanism which attaches said frame to a side wall of the collection box with said exit opening aligned with the outlet opening in the collection box;

d. a second attachment mechanism attaching said frame to a ceiling of the collection box in a position with the frame inlet opening positioned at a level below the collection box ceiling; and e. a filter sock comprising an elongate tube of filtration fabric which is open at both ends and which is sized to slip over said helical coil frame and substantially cover said additional opening.

19. A filtration system as in claim 18, said second attachment mechanism comprising:

a. a cord attached to and extending about the periphery of an open end of said filter sock;

b. a plurality of elongate suspension members, each of which is attached at one end to said cord and to said coil frame near said inlet opening; and c. at least one bracket attached to the collection box ceiling, said suspension members being attachable at a second end to said at least one bracket.

20. A filtration system as in claim 19, wherein said elongate suspension members comprise chains.

21. A filtration system as in claim 18, wherein said first attachment mechanism comprises bracket(s) arrayed around the exit opening of said frame and a plurality of anchors anchoring the bracket(s) to the collection box sidewall.

22. A filtration system as in claim 18, wherein said first attachment mechanism comprises:

a. a buffer with an aperture extending therethrough, said buffer being attached to the collection box side wall with said aperture aligned with the outlet opening in the collection box, at least an inside surface of said buffer being relatively smooth; and b. bracket(s) arrayed around the exit opening of said frame and a plurality of anchors anchoring the bracket (s) to the inside surface of said buffer with said frame exit opening aligned with said aperture in said buffer.

23. A storm drain filtration system comprising:

a. a flexible hollow frame having a lower opening stably alignable with the outlet of a storm drain collection box, an upper opening, and at least one side opening; and b. a filter capable of substantially covering said side opening.

* * * * *